Jan. 7, 1969     H. J. MALACHOWSKI     3,420,490

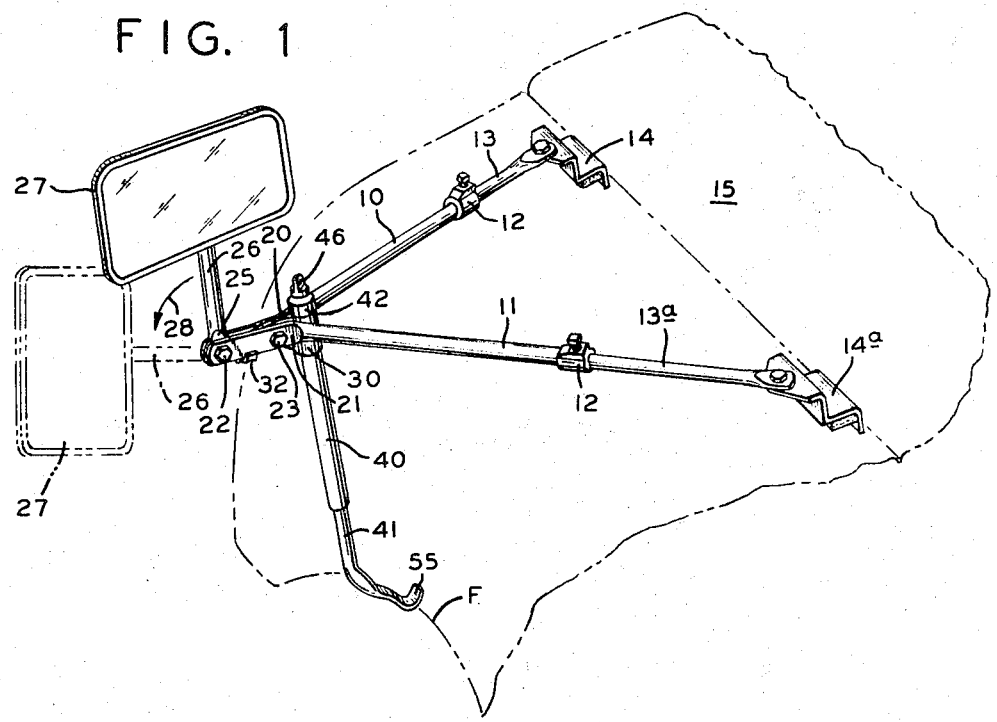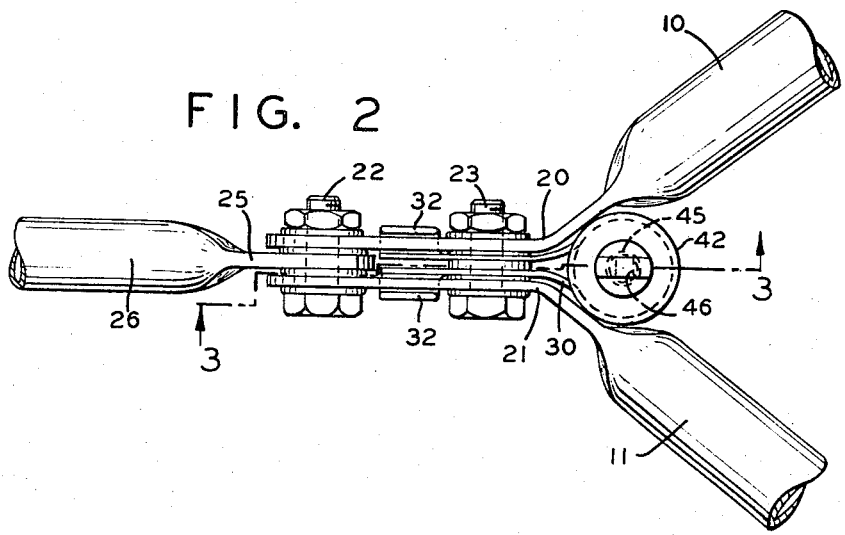

REAR VIEW MIRROR SUPPORT BRACKET

Filed April 12, 1967     Sheet 2 of 2

INVENTOR.
HANDRY J. MALACHOWSKI
BY
ATTORNEY.

United States Patent Office 3,420,490
Patented Jan. 7, 1969

3,420,490
REAR VIEW MIRROR SUPPORT BRACKET
Handry J. Malachowski, Wilton, Conn., assignor to Yankee Metal Products Corp., Norwalk, Conn., a corporation of New York
Filed Apr. 12, 1967, Ser. No. 630,263
U.S. Cl. 248—486                    9 Claims
Int. Cl. A47g 1/24; A47f 5/00

ABSTRACT OF THE DISCLOSURE

An outside rear view mirror support bracket having a pair of arms and a leg which when applied to the fender and the hood and drawn together, apply stresses that hold the bracket fixed to the automobile entirely through the stresses.

---

This invention relates to a mirror support bracket of that type used for mounting an outside rear view mirror on an automobile. More particularly, my invention relates to a mirror support bracket to be used for holding an outside rear view mirror on an automobile that is attached to a trailer.

Because a trailer is considerably wider than the standard passenger automobile, it is necessary for the rear view mirror on the automobile pulling the trailer to extend outwardly more than does the standard rear view mirror. When the automobile is disconnected from the trailer, the mirror must be removed because in its outwardly extended position it will form a considerable hazard. For this reason, mounting and support brackets for rear view mirrors of the class described must be made so that they are readily removable from the automobile and readily replaceable when needed. Moreover, they must be so formed as to collapse for easy handling and storage, and they must not, when assembled to the automobile deface it in any way.

Mirror support brackets adapted for the particular purpose that I have outlined are quite well known in the art. However, so far as I know, there has never been contributed a mirror support bracket of the class described in which the parts are simple, few in number, and relatively rigid in their relation to one another so as to facilitate assembly and disassembly.

As a feature of my invention, I contribute a mirror support bracket in which a pair of arms form a V therebetween with the ends spaced from the V adapted for assembly to the automobile, preferably at the hood. Extending downwardly from the apex of the V that is formed by the two arms, is a leg that is adapted to coact with the outlining edge of a fender. This leg is adjusted relatively to the V of the apex, and when adjusted, tends to apply considerable stress to the arms and the leg so that there is established a binding relationship between the arms and the leg, the fender and the hood. This holds the parts assembled to the automobile as those skilled in the art will readily appreciate.

As a further feature of my invention, the leg portion of the bracket, when adjusted, exerts considerable stress on the arms tending to rotate the leg relatively to the arms. This movement is resisted effectively so as to permit the development of stresses for holding the entire assembly in position relatively to the automobile.

As a further particular feature of the invention, the leg is mounted for rotation relatively to the apex formed by the arms, so that the entire assembly is collapsible for easy storage and handling.

It is a further particular feature of the invention that the rotation of the leg in one direction is limited by a stop, so that stresses may be developed between the leg and the arms for holding the support bracket properly and effectively assembled to the automobile.

It is a further particular feature of the invention that the vertical leg may be formed of telescoping parts so that its adjustment is brought about through the actual shortening of the leg, thereby applying stress to the entire assembly and holding it assembled to the car.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims be regarded as including such equivalent constructions as do not depart from the spirit and scope of my invention, in order to prevent the appropriation of my invention by those skilled in the art.

Referring now to the drawings:

FIGURE 1 is a perspective view showing the mirror support bracket of my invention applied to an automobile;

FIGURE 2 is a view looking downwardly on the apex of the V bracket formed by the arms of my mirror support;

Figure 3:
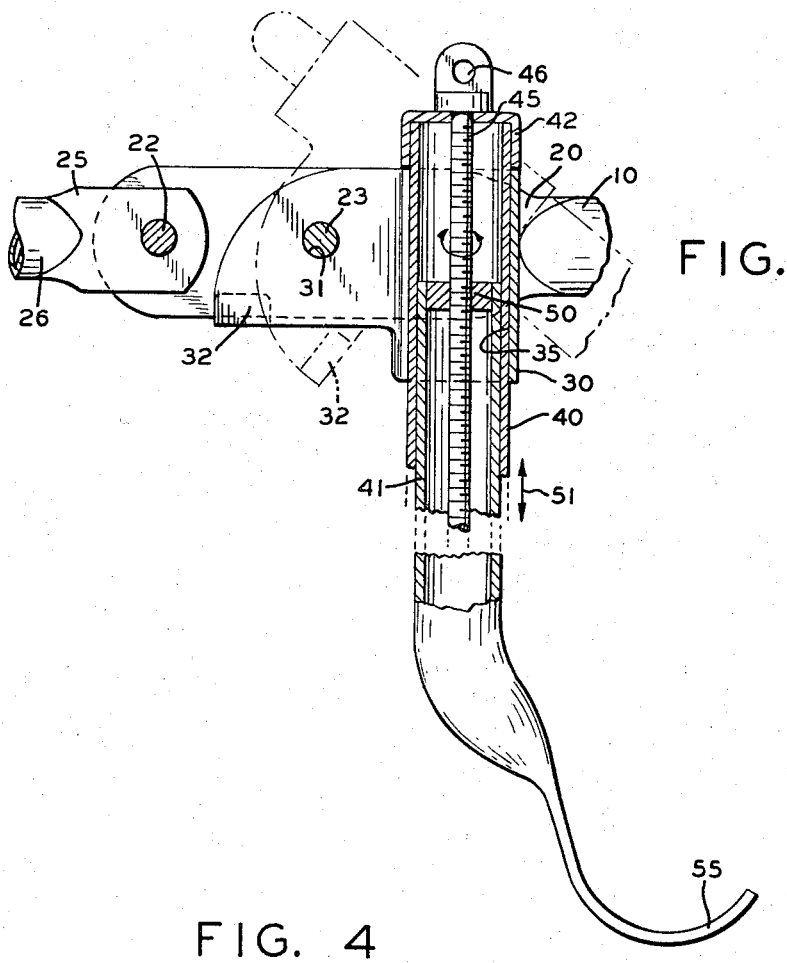
FIGURE 3 is a partial section along line 3—3 of FIGURE 2.

Referring now more particularly to the drawings, reference numeral 10 indicates one arm of the V bracket of my invention, while reference numeral 11 refers to the other arm. Each arm is formed of two parts adjusted relatively to one another through fastening devices 12 whereby to vary the length of the arms. Thus, the adjustable portion of the arm 10 is designated by reference numeral 13 and it carries a fastening device 14 that is adapted to drop into a position partially under the hood 15 of an automobile, and thereafter to be retained by the hood in the position illustrated in FIGURE 1. The adjustable portion of arm 11 is designated by reference numeral 13a because it is exactly like the part 13 and it has a bracket 14a held, as is the bracket 14, by the hood 15. It will be well to indicate at this point that the adjustable feature of the arms 10 and 11, and the manner in which the arms are held by the hood 15, are all well known in the art and are shown in issued patents.

Each of the arms 10, 11 is tubular in form, and each arm is flattened as is probably best illustrated in FIGURE 2. Thus, arm 10 is formed with a flattened portion 20, while arm 11 is formed with a flattened portion 21. The flattened portions 20 and 21 are assembled to one another by a pair of bolts, one of which is designated by numeral 22 and the other by numeral 23. Through suitable nuts, the bolts may be used to draw the flattened portions 20 and 21 toward one another and to mount therebetween particular parts to be described below.

Thus, bolt 22 is adapted to hold between the two flattened parts 20 and 21, a flattened portion 25 of a tubular part 26, at the end of which is supported the rear view mirror 27 of my invention. Obviously, as shown in FIGURE 1, the mirror 27 may be moved on the axis of the bolt 22 for adjusting the mirror, as is particularly well illustrated in FIGURE 1 and as designated by arrow 28.

Figure 4:
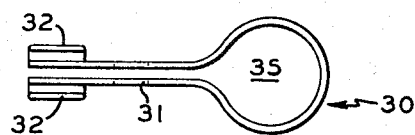
FIGURE 4 is a view looking downwardly on the holder sleeve in which my vertical leg slides.
Figure 5:
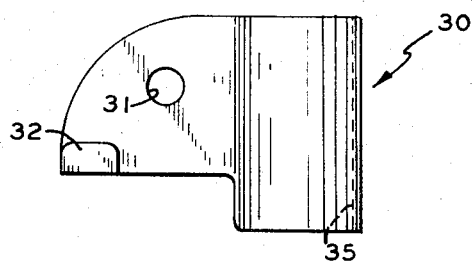
FIGURE 5 is an elevation of the holder sleeve of FIGURE 4.

The bolt 23 holds fastened between the two flattened portions 20, 21, the holder sleeve 30 best illustrated in FIGURES 4 and 5. This holder sleeve is bored at 31 for the bolt 23 and is adapted to rotate about the axis of the bolt 23, as probably best illustrated in FIGURE 3. Holder sleeve 30 has a pair of stop lugs 32 for limiting its rotation clockwise on the bolt 23 as is also well illustrated in FIGURE 3. Thus, the two lugs 32 will ride against the opposed flattened portions 20 and 21 as is further well illustrated in FIGURES 1 and 2. This utilization of the lugs 32 is of rather considerable importance in the operation of my invention as will be set forth presently.

Within the sleeve opening 35 of my holder sleeve 30, I mount for sliding movement a vertical leg comprising telescoping portions 40 and 41. Obviously, the portion 40 of the telescopic leg is in surface contact with the inner surface of the holder sleeve 30. At the upper end of the portion 40, I fix, preferably through a forced fit, a cap 42. This cap limits the downward sliding movement of the portion 40 relatively to the holder sleeve 30, as best illustrated in FIGURE 3. The inner telescopic portion 41 is adjustable relatively to the outer portion 40 by use of a threaded bolt 45, the upper end of which is slabbed and further formed with a hole 46. It is also initially assembled to portion 40 by inward movement upwardly into 41. Through insertion of a nail or similar pin into the opening 46, the bolt 45 may be readily rotated. Its threads are in threaded relation to a plate 50 that is integral, after suitable assembly, to the inner telescopic part 41. Obviously, by rotating the bolt 45, the two telescoping parts 40 and 41 may be brought toward and away from one another, as well signified by the arrow 51 in FIGURE 3.

In utilizing my invention, the two arms 10 and 11 will be applied as shown in FIGURE 1, after which the leg formed by the telescoping parts 40 and 41 will be extended. This extension of the leg will bring the curved portion 55 of the inner part 41 just beneath the outlining edge of a fender F of the automobile. Thereafter, the rotation of the bolt 45 will bring about telescoping movement toward one another of the leg portions 40 and 41. This will gradually apply considerable stress between the arms 10 and 11 on the one hand, and the leg 40, 41 on the other hand, with the leg reacting against fender F through part 55. Preferably, the leg will lie generally at right angles to the plane of the arms 10 and 11 as illustrated in full lines in FIGURE 3.

The shortening of the leg by action of the bolt 45 will serve to apply very considerable stresses tending to rotate the telescopic leg and the holder sleeve 30 relatively to the bolt 23 and the arms 10 and 11. Rotation will be prevented by coaction of the lugs 32 with the flattened portions 20 and 21 of the arms 10 and 11. Greater and greater stress will be applied and these stresses will react through the lugs 32 to bring about a rigid securing relationship between the arms 10 and 11, the telescopic leg 40, 41, the fender F, and the body of the automobile through hood 15.

Once the arms 10 and 11 are adjusted in length, and the approximate length of the telescopic leg is determined, it becomes very simple indeed to assemble the support bracket to the automobile. Further, since the telescopic leg 40, 41 is rotatable bodily with the holder sleeve 30 relatively to the arms 10, 11 as illustrated in FIGURE 3, it is possible to collapse the entire assembly, as is also quite apparent from the drawings, and particularly the dash and dotted line showing of FIGURE 3.

Those skilled in the art will appreciate that I have contributed an assembly through which a mirror can be readily and quickly attached to an automobile and thereafter quickly removed and collapsed for storage. All this can be done without fastening means that deface the automobile or which require tools or other equipment.

What is claimed is:

1. In a mirror support bracket of the class described, a pair of arms adapted each to be secured at one end to a vehicle in spaced relation over a fender of the vehicle and secured to one another at the other ends thereof in angular relation, the said other ends secured to one another forming the apex of a V bracket portion comprising said arms, a generally vertical leg assembled at one end thereof to the juncture of said arms forming said apex and having at its opposed end a securing part for cooperation with the fender of the vehicle, means for adjusting the effective length of said leg by moving said leg securing part toward said juncture so as to apply force through said fender tending to rotate said leg bodily in one direction relatively to said apex of the V bracket portion, means for preventing such rotation of said leg relatively to said apex whereby the forces applied in moving said leg securing part relatively to said pair of arms holds said support bracket assembled to said vehicle, and means for securing a mirror to said bracket formed by said arms and leg.

2. In the combination of claim 1, the feature that said arms lie generally horizontally relatively to said vehicle and that said vertical leg is at substantially right angles to the plane of said arms in close juxtaposition to said fender, when said bracket is assembled to said vehicle.

3. In the combination of claim 1, the feature that said vertical leg is mounted for rotation relatively to said apex to collapse said bracket, and stop means for preventing rotation of said leg relatively to said arms in said one direction when said arms and leg are secured to said vehicle and fender.

4. In the combination of claim 1, the feature that said vertical leg comprises telescoping parts whereby through relative movement of said telescoping parts said securing part is adjusted relatively to said apex juncture.

5. In the combination of claim 1, the feature that said leg lies substantially at right angles to said arms with means preventing a change of angularity as the securing part of the leg is moved toward the apex juncture.

6. In the combination of claim 1, the feature that said pair of arms are joined at said apex by a pair of spaced bolts coacting with juxtaposed bent portions of said arms to hold said arms assembled.

7. In the combination of claim 6, the feature that said vertical leg is mounted on a holder rotatably mounted on one of said bolts while the mirror is held secured by the other of said bolts.

8. In the combination of claim 3, the feature that said vertical leg is mounted for sliding movement on a holder rotating relatively to said apex juncture.

9. In the combination of claim 8, the feature that said holder is a sleeve and that said vertical leg comprises telescoping parts whereby through relative movement of said telescoping parts said securing part is adjusted relatively to said sleeve.

References Cited

UNITED STATES PATENTS

| | | | |
|---|---|---|---|
| 2,552,074 | 5/1951 | Thompson | 248—279 |
| 3,259,349 | 7/1966 | Lee | 248—480 |
| 3,372,897 | 3/1968 | Lee | 248—480 |

ROY D. FRAZIER, *Primary Examiner.*

FRANK DOMOTOR, *Assistant Examiner.*

U.S. Cl. X.R.

248—279